(12) United States Patent
Mysore et al.

(10) Patent No.: US 7,421,795 B2
(45) Date of Patent: *Sep. 9, 2008

(54) SAPPHIRE ALIGNMENT FIXTURE

(75) Inventors: Ananda V. Mysore, Sunnyvale, CA (US); Steve G. Gonzalez, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 11/498,832

(22) Filed: Aug. 4, 2006

(65) Prior Publication Data
US 2008/0028627 A1 Feb. 7, 2008

(51) Int. Cl.
*G01B 5/004* (2006.01)
(52) U.S. Cl. ........................................... 33/568
(58) Field of Classification Search .................. 33/568
See application file for complete search history.

(56) References Cited

U.S. PATENT DOCUMENTS

| | | | | |
|---|---|---|---|---|
| 3,831,283 A | * | 8/1974 | Pagella et al. | 33/559 |
| 4,631,834 A | * | 12/1986 | Hayashi et al. | 33/503 |
| 4,676,649 A | * | 6/1987 | Phillips | 33/1 M |
| 4,778,313 A | * | 10/1988 | Lehmkuhl | 33/559 |
| 5,068,972 A | * | 12/1991 | Herzog et al. | 33/503 |
| 5,088,208 A | * | 2/1992 | Wells et al. | 33/559 |
| 5,682,682 A | * | 11/1997 | Renfrew et al. | 33/556 |
| 5,705,741 A | * | 1/1998 | Eaton et al. | 33/558 |
| 6,260,282 B1 | * | 7/2001 | Yuan et al. | 33/1 M |
| 7,159,327 B2 | * | 1/2007 | Baruchello et al. | 33/561 |
| 7,350,308 B2 | * | 4/2008 | Mysore et al. | 33/503 |
| 2007/0137056 A1 | * | 6/2007 | Mysore et al. | 33/503 |

* cited by examiner

*Primary Examiner*—Christopher W Fulton
(74) *Attorney, Agent, or Firm*—Darby & Darby PC

(57) ABSTRACT

A metrology system comprises a support structure, a fixture having a bottom surface resting on a surface of the support structure and moveable relative to the support structure, and a first measurement assembly for interacting with a workpiece held by the fixture to measure a characteristic of the workpiece. One of the bottom surface of the fixture and the surface of the support structure comprises sapphire, and the other of the bottom surface of the fixture and the surface of the support structure comprises a metal.

20 Claims, 4 Drawing Sheets

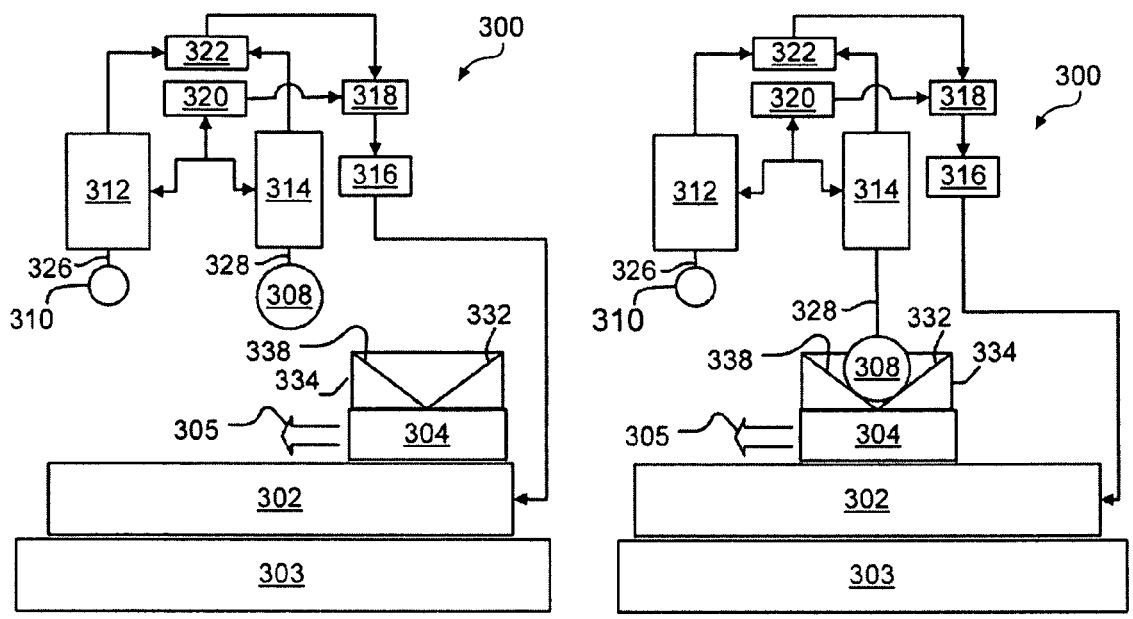
FIG. 3A
PRIOR ART
FIG. 3B
PRIOR ART
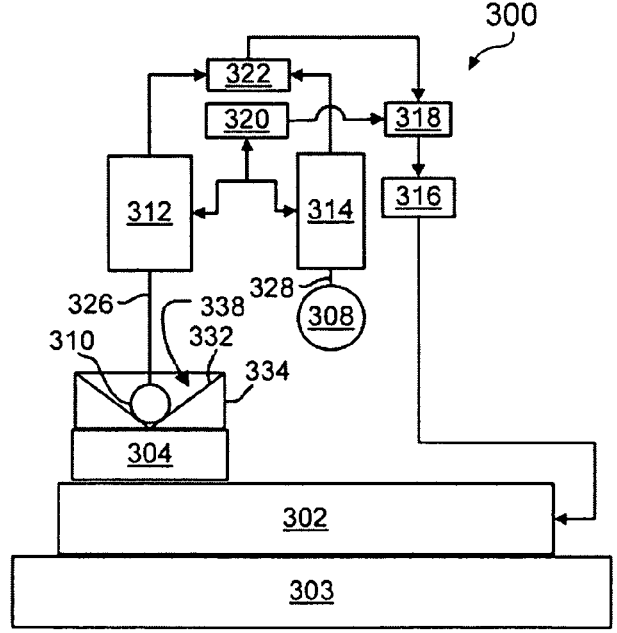
FIG. 3C
PRIOR ART

SAPPHIRE ALIGNMENT FIXTURE

FIELD OF INVENTION

The present invention relates generally to metrology of objects, and more particularly to measuring angles and characteristics of cavities, such as cavities of conical sleeves that may be used in disc drives.

BACKGROUND

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density of media has tended to increase and the size of storage systems has tended to decrease. This trend has led to a need for greater precision, which has resulted in tighter tolerance for components used in disc drives. In turn, achieving tighter tolerances in components requires increased precision in metrology systems for characterizing and parameterizing those components. Measuring angles of objects is one aspect of metrology, and measuring angles of conical cavities is of interest for some disc drive designs.

Metrology systems may include systems that use technology requiring contact with a workpiece as well as systems that obtain metrology data without contacting a workpiece. It is often the case that non-contact systems can be more precise than contact systems, but can be more expensive. Contact based systems can damage workpieces. What is needed is a low-cost, accurate, and repeatable metrology system that may be used, for example, in metrology of disc drive components.

The following description is presented to enable a person of ordinary skill in the art to make and use various aspects of the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed in various metrology applications, including metrology of components of motors used in disc storage drives. Metrology equipment employing aspects disclosed herein may be designed and may operate in a number of ways. The exemplary apparatuses and systems provided herein are for illustrating various aspects and are not intended to limit the range of metrology apparatuses and systems in which examples and aspects may be applied.

FIG. 1 illustrates a cross-section of a conventional disc drive motor portion. The portion includes a hub 10 supporting discs 12. In operation, the hub 10 rotates about a fixed shaft 14. The fixed shaft 14 includes an upper shaft bearing cone 16 and a lower shaft bearing cone 18. An outer surface 34 of upper shaft bearing cone 16 forms an upper hydrodynamic bearing region 20 with opposing upper conical bearing sleeve 28. An outer surface 32 of the lower shaft bearing cone 18 forms a lower hydrodynamic bearing region 24 with opposing lower conical bearing sleeve 30. For proper operation, there should be an engineered fit between each of the shaft bearing cones 16 and 18 and respectively opposing conical bearing sleeves 28 and 30.

An aspect of this engineered fit is the angle at which the conical bearing sleeves 28 and 30 taper. To continue increasing disc drive performance, the angle at which conical bearing sleeves 28 and 30 taper will likely have to be increasingly controlled, for example to within 0.01 degrees or better of an engineered specification. In turn, determining whether conical bearing sleeves 28 and 30 are within 0.01 degrees of specification requires an accurate and repeatable metrology device and method. Since another factor considered in disc drive production is cost, the metrology device should be low cost. Cost may include such factors the metrology device's cost, and also whether the metrology system damages a workpiece being measured, and the speed at which a measurement can be completed.

FIG. 2 illustrates aspects of a conceptual method for deriving an angle $2\theta$ of a conical cavity 208 (shown in cross-section) that exists, for example, in a conical bearing sleeve. A first sphere 212 having a known (or determinable) diameter is inserted in the conical cavity 208. A first height 204 associated with positioning of the first sphere 212 is measured. This measurement is made with respect to a reference such as illustrated at 202. The first sphere 212 may then be removed from conical cavity 208. A second sphere 210 is then inserted into the conical cavity 208. A second height 206 associated with positioning of the second sphere 210 is measured; second height 206 is preferably a measurement made with respect to the reference 202. After obtaining the first height 204 and the second height 206, an angle equal to one half of angle $2\theta$ may be calculated by application of the formula below. $R_1$ is the radius of the first sphere 212. $R_2$ is the radius of the second sphere 210. $H_1$ is the first height 204. $H_2$ is the second height 206.

$$\theta = a\sin\left[\frac{R_1 - R_2}{(H_2 - H_1) - (R_1 - R_2)}\right]^{-1}$$

FIGS. 3A-C illustrate schematic aspects of an exemplary metrology system 300 implementing aspects of the above sleeve cone angle measurement strategy. In illustrating these aspects, reference is made to sources of inaccuracy and non-repeatability in components of the metrology system 300. These sources of inaccuracy and non-repeatability combine into a complete measure of the accuracy and repeatability of the metrology system, commonly referred to as Gauge Repeatability and Reproducibility (GRR). Such references are by way of example and not limitation; other metrology systems created and operating by aspects presented herein may have fewer or additional sources of inaccuracy and non-repeatability.

Generally, a lower GRR signifies a more stable metrology device than a higher GRR. GRR has two primary components, repeatability and reproducibility. Repeatability is the ability of the same gauge to provide a consistent measurement during a number of uses by the same operator, and reproducibility is the ability of a gauge to give a consistent measurement regardless of the operator. GRR is typically a measurement of the variability percentage of the total available engineering tolerance for the part. For any given system, a target maximum GRR may be selected, and various parameters may be chosen or modified to avoid exceeding that GRR.

Metrology system 300 includes a supportive base 303 that may be formed from granite or another material that may aid in isolating sensitive components of the metrology system 300 from ambient vibrations or other disturbances. A stage guide 302 is disposed on the supportive base 303. The stage guide 302 provides a track over which a stage 304 may move as illustrated by movement arrow 305. A fixture 334 is disposed on stage 304 and a workpiece 332 is disposed in the fixture 334. Aspects of the fixture 334 will be further described herein.

In exemplary aspects, the workpiece 332 is a sleeve cone. The sleeve cone is disposed in fixture 334 to provide accessibility to a cavity 338 of the sleeve cone, as illustrated in cross-section in FIGS. 3A-C. An outer surface portion of the workpiece 332 may take any number of shapes, for example, the outer portion may be cylindrical, and need not be conically tapered. Fixture 334 may be adapted to accommodate such variations in workpiece 332.

Additional components of the metrology system 300 include a first sphere 308 coupled by a plunger 328 to a first gauge 314, which outputs information to data acquisition logic 322. First sphere 308 is exemplary and other shapes may be used; for example, a hemisphere may also be used as further described herein. The first sphere 308, plunger 328, and first gauge 314 make up a first measurement assembly. The information outputted by the first gauge 314 may include information describing an amount of extension of the plunger 328. The amount of extension may in turn be used as an indicium of a position of the first sphere 308 in workpiece 332. This indicium of position may be viewed or otherwise interpreted into a height of the first sphere 308 with respect to a reference, in keeping with the conceptual illustration of FIG. 2.

The metrology system 300 also includes a second sphere 310 coupled by a second plunger 326 to a second gauge 312. The second sphere 310, second plunger 326, and second gauge 312 make up a second measurement assembly. The second gauge 312 outputs information that may include information describing an amount of extension of the second plunger 326. The amount of extension may in turn be used as an indicium of a position of the second sphere 310 in workpiece 332. This indicium of position may be viewed or otherwise interpreted into height information of the second plunger 326 with respect to the reference. The amount of extension may be transmitted to the data acquisition logic 322. Other exemplary embodiments may include any amount of preprocessing of extension information. The present invention contemplates metrology using other mechanisms, such as rotatable arms, to extend and retract first sphere 308 and second sphere 310.

The data acquisition logic 322 in turn communicates with a central processing unit 318. The central processing unit 318 interfaces with gauge controller 320 which controls aspects of both the first gauge 314 and the second gauge 312, as discussed below. The central processing unit 318 also interfaces with stage controller 316. Stage controller 316 interfaces with the stage guide 302, thereby controlling movement and positioning of the stage 304. Aspects of the metrology system 300 are further illustrated in FIGS. 3B-C, which show how the spheres 308, 310 are used to measure the sleeve cone angle of the workpiece 332.

FIG. 3A illustrates that stage 304 moves in an exemplary direction indicated by movement arrow 305, and that this movement is initiated by central processing unit 318 controlling the stage through the stage controller 316. FIG. 3B illustrates that stage 304, by direction from the central processing unit 318, positions the workpiece 332 substantially under first sphere 308. In addition, the central processing unit 318 has directed the first gauge 314 to extend first plunger 328 for contacting first sphere 308 to workpiece 332. Based on an amount of extension of the first plunger 328, indicium of a position of the first sphere 308 in the workpiece are determined. Such indicium may include (or may be expressed as) a height of the first sphere 308 with respect to a reference.

FIG. 3C illustrates that first sphere 308 has been retracted and that the stage 304 has moved the workpiece 332 substantially under the second sphere 310. FIG. 3C also illustrates that the second gauge 312 has extended the second plunger 326 so that second sphere 310 contacts the workpiece 332. As described above, these actions may be initiated by central processing unit 318 providing commands or other information to gauge controller 320 and to stage controller 316. Based on an amount of extension of the second plunger 326, indicium of a position of the second sphere 310 in the workpiece are determined. Such indicium may include (or may be expressed as) a height of the second sphere 310 with respect to a reference.

Gauges 312 and 314 may include sensors for determining an amount of extension of the first and second plungers 328, 326. For example, such sensors may include interferometry sensors and associated supporting equipment. Exemplary gauges that may be used include Heidenhain Metro 1287 gauges.

In an embodiment of the invention, the stage controller 316 and the plunger controller 320 interface with the stage 304 and the first and second gauges 314, 312, respectively, at least partially pneumatically. For example, the first and second gauges 314, 312 may each include plunger controls that interface with plunger controller 320 through pneumatic control lines. By applying air pressure through the pneumatic control lines, plunger controller 320 may initiate extension of the first and second plungers 328, 326.

By applying vacuum to those pneumatic control lines, plunger controller 320 may slow extension of, and retract, the first and second plungers 328, 326. Retraction and slowing may also be initiated by spring mechanisms associated with the plunger controls. A rate at which the first and second plungers 328, 326 extend may be controlled to prevent damage to workpiece 332. Timing of slowing extension of the first and second plungers 328, 326 may be controlled to allow rapid extension, and then slowing at a time before contact with workpiece 332. An amount of pressure (vacuum or greater than ambient) and/or volume of gas may be selectable based on the weights of the plungers 328 and 326 and first and second spheres 308, 310.

In a general sense, aspects described in FIGS. 3A-C include fixture 334 dimensioned to hold a workpiece (e.g., workpiece 332) and a first object (e.g., first sphere 308) that is sized to at least fit a portion of the workpiece that is the subject of metrology. The nature of this fit may vary depending on characteristics of the portion of the workpiece subjected to metrology and characteristics of the first object, including size and shape of each.

Also, first plunger 328 is an example of a structural portion for mounting the first object to provide for movement of the first object along a path that results in contact with the workpiece 332. This path, between various metrology uses, need not have precisely the same starting point or ending point, but this path would be expected to lead to contact with the workpiece 332. This path may be predetermined based on the arrangement of the structural portion.

Similarly, plunger controller 320 may be generally viewed as a position controller for the structural portion for mounting the first object. As such, there may be a separate position controller for the first object structural portion and the second object structural portion. Functionality and/or functional portions of each position controller may also be distributed. For example, pneumatic valve(s), motor(s), or other actuators may be included proximate the structural portion, circuitry for controlling that valve(s) may be at a separate location, and computation logic for controlling the circuitry may be at yet another location.

Upon contact, the first object fits with the workpiece at a portion of the workpiece determined by interaction between sizes and shapes of the first object and the workpiece. First gauge 314 is an example of a sensor that can be viewed as sensing a distance traveled by the first object along the path and producing a signal indicative of such distance.

Also, control-related aspects and associated apparatuses, such as stage controller 316, data acquisition logic 322, and plunger controller 320 may be implemented in any of a variety of ways that provide a variety of divisions between mechanical control (e.g., valving, timing, cams, gears, and other devices useful in constructing mechanical apparatuses) and electronic control, between software control running on general purpose processors and application specific hardware implemented in ASICS, FPGAs, or other suitable logic implementations. Aspects relating to second sphere 310, second plunger 326, and second gauge 312 may similarly be generalized.

FIG. 4 illustrates a perspective view of an exemplary implementation of metrology system 300. Base 303 supports stage guide 302. Stage guide 302 includes a first rail 402, a second rail 404, and a top portion 406. A stage 304 interfaces with first rail 402 and second rail 404, which provide guidance to stage 304 as it moves along the stage guide 302. The stage 304 also fits closely to the top portion 406, which can aid in reducing variation of distance between a workpiece 332 disposed in fixture 334 and gauges 314, 312. By reducing variation, the stage can increase accuracy and repeatability because changes in amount of extension of plungers 328, 326 due to such variations would be reduced, and therefore measurement error and variations between measurements would be reduced.

It is known to use an air bearing stage at 304 to achieve a relatively small positioning error. However, air bearings can be prohibitively expensive.

FIG. 5 provides a top view of portions of metrology system 300. Base 303 supports stage guide 302 on which stage 304 moves. Fixture 334 is illustrated as a ring that is placed within a part holding nest 506. The part holding nest 506 defines a surface over which fixture 334 may move under application of force on workpiece 332 (which, as state above, is held by fixture 334) by first sphere 308 or second sphere 310 as each sphere contacts workpiece 332. Workpiece 332 can include a conical cavity to be measured. Although stage 304 may approximately align a bottom of the conical cavity under each of first sphere 308 and second sphere 310, there may be some misalignment, and the first sphere 308 and second sphere 310 may each initially contact workpiece 332 at a point that is not as low in the conical cavity as each sphere may reach. This may occur, for example, when the workpiece is not completely centered under the sphere. This may also occur, for example, when the workpiece is not positioned properly in the fixture (e.g., as low in the cavity of the fixture as possible).

Getting each of first sphere 308 and second sphere 310 as low as possible in the conical cavity of workpiece 332, for example through alignment of the workpiece under each sphere, may increase accuracy of the cone angle measurement. Accuracy of cone angle measurement may additionally or alternatively be increased by proper placement of the workpiece within the fixture.

SUMMARY OF THE INVENTION

This invention relates to a metrology system comprising a support structure, a fixture having a bottom surface resting on a surface of the support structure and moveable relative to the support structure, and a first measurement assembly for interacting with a workpiece held by the fixture to measure a characteristic of the workpiece. One of the bottom surface of the fixture and the surface of the support structure comprises sapphire, and the other of the bottom surface of the fixture and the surface of the support structure comprises a metal.

This invention also relates to a method for measuring a characteristic of a workpiece comprising loading a workpiece into a fixture that rests on a support structure, wherein interfacing surfaces of the fixture and the support structure have a coefficient of friction in a certain range, moving the workpiece and a first measurement assembly relative to each other so that the workpiece is aligned with the first measurement assembly, moving a component of the first measurement assembly to contact the workpiece to obtain a first measurement of a characteristic of the workpiece, and receiving and calculating the first measurement of the characteristic of the workpiece. When the component contacts the workpiece, the fixture is adapted to slide on the support structure in response to a force exerted on the workpiece and the fixture by the component.

This invention further relates to a metrology system comprising a support structure, a fixture having a bottom surface resting on a surface of the support structure and moveable relative to the support structure, and a first measurement assembly for interacting with a workpiece held by the fixture to measure a characteristic of the workpiece. A surface of the fixture that abuts the workpiece to hold the workpiece comprises sapphire.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

FIGS. 3A-C schematically illustrate exemplary aspects of a conventional metrology system.

DETAILED DESCRIPTION

Figure 1:
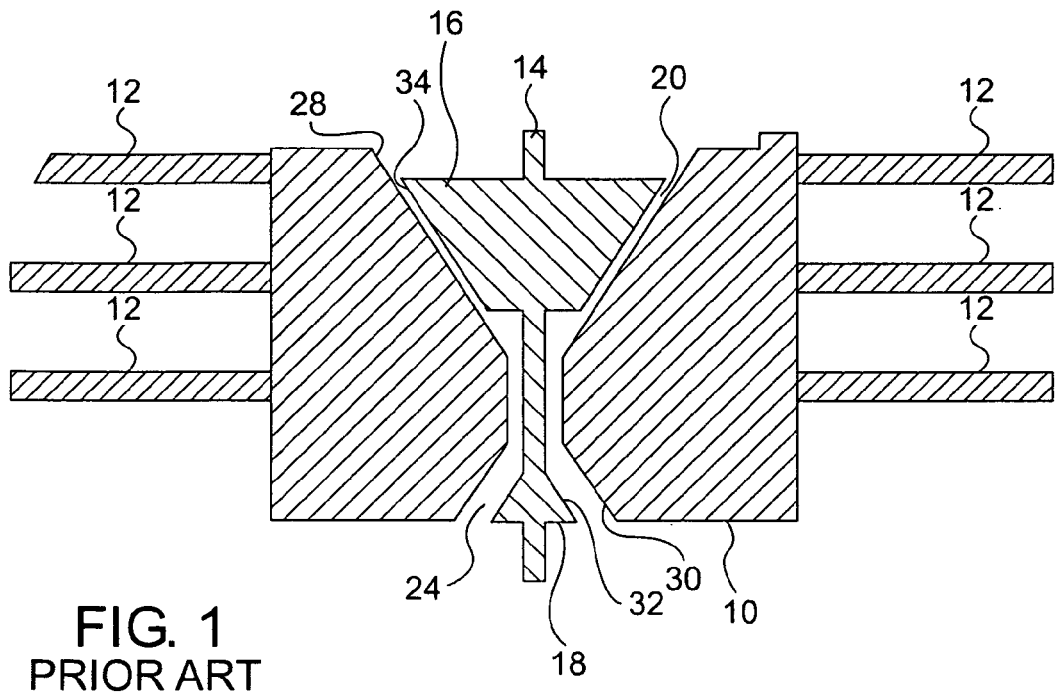
FIG. 1 illustrates a partial section of a conventional hydrodynamic or air bearing having conical sleeves.
Figure 2:
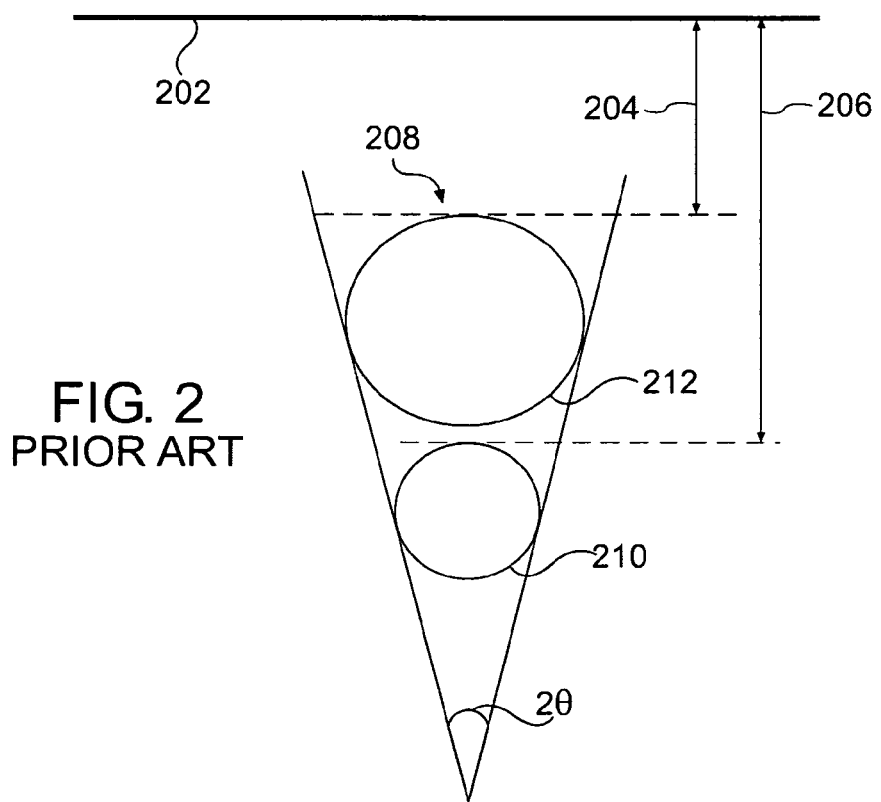
FIG. 2 illustrates a conventional two-ball cone angle measurement system.
Figure 4:
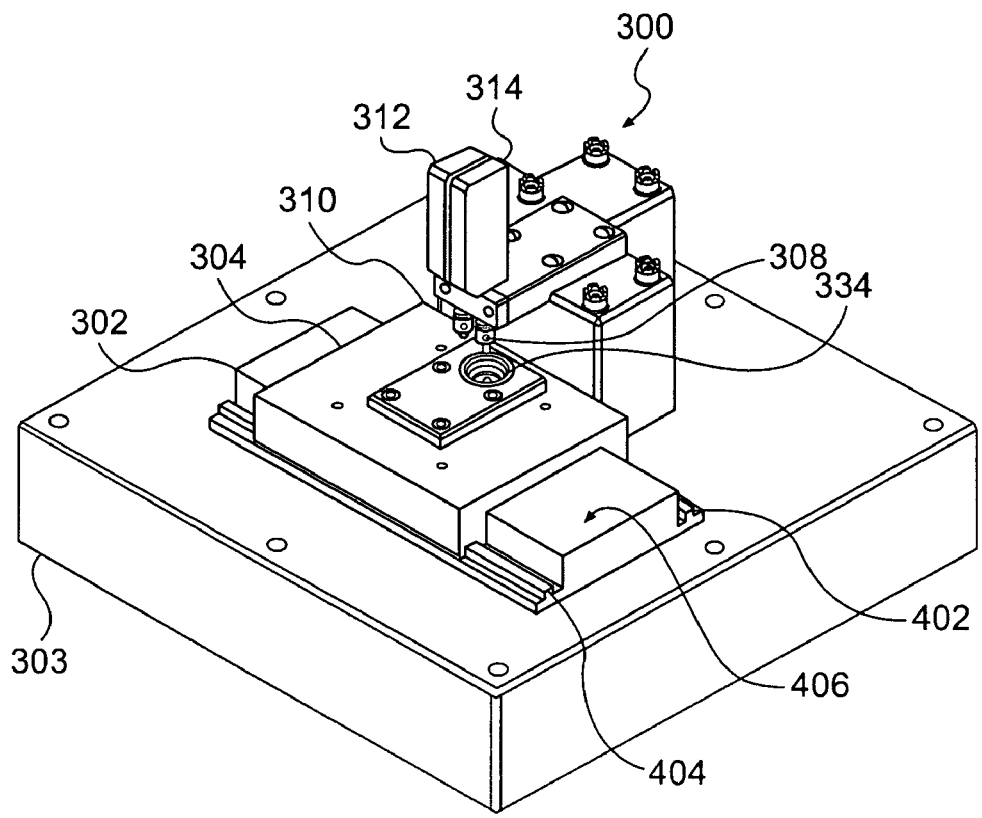
FIG. 4 illustrates a perspective view of an exemplary implementation of a metrology system.
Figure 5:
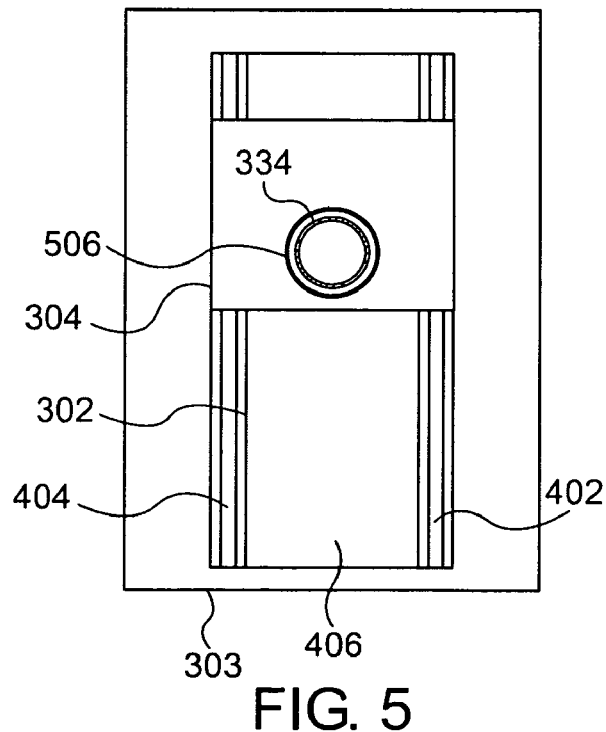
FIG. 5 illustrates an embodiment of a portion of an exemplary implementation of a metrology system.

Referring again to FIG. 5, the present invention provides for improved movement of the workpiece 332 relative to the stage 304, within boundaries set by the part holding nest 506, to correct any misalignment of the sphere and the workpiece during measurement. Indeed, the present invention contemplates a workpiece that is almost free-floating so that it aligns itself when positioned relative to the height gauge, without using expensive air bearings.

Due to the angle of conical workpiece walls, first sphere 308 and second sphere 310 tend to exert some force horizontally (in addition to the obvious vertical forces) when resting on workpiece 332. The present invention contemplates providing a low-friction interface between complementary surfaces of the workpiece 332 and the fixture 334, and/or between the fixture 334 and the stage 302 (i.e., a coefficient of friction low enough to allow movement of workpiece 332 relative to the stage 302 under the horizontal force applied by the spheres). A low-friction interface between complementary surfaces of the workpiece 332 and the fixture 334 allows the workpiece 332 to find a lower position in the fixture. Similarly, a low-friction interface between complementary surfaces of the fixture 334 and the stage 302 allows the fixture to move relative to the stage to position its workpiece properly under the spheres. This ensures a desirable (e.g., lower) position of the workpiece 332 within the fixture 334, and also that the sphere will seat at the same contact diameter of each workpiece, thereby providing increased consistency of measurement.

Aspects of metrology system 300 that affect an allowable approximate maximum friction coefficient include vertical force of the sphere/plunger combination on the workpiece, friction forces at the sphere/workpiece interface, and angle of contact between the sphere and the workpiece.

Figure 6:
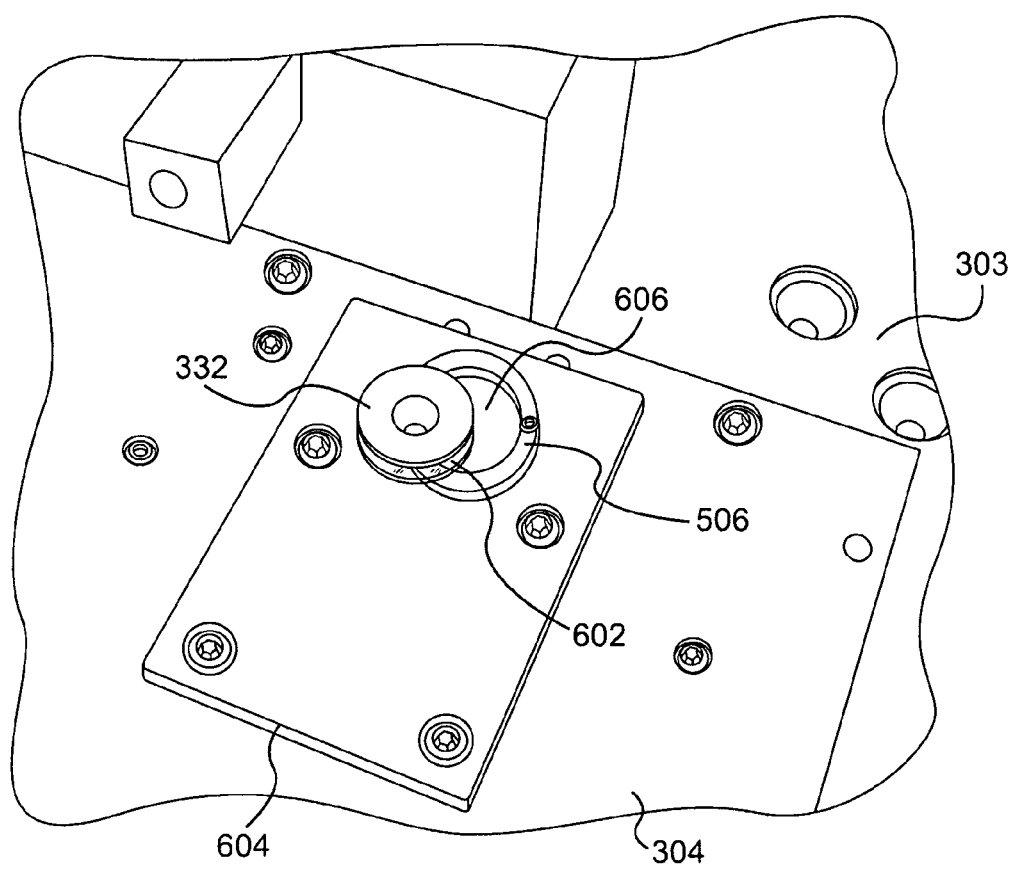
FIG. 6 illustrates an embodiment of a portion of a metrology system of the present invention.

In an exemplary embodiment of the invention, illustrated in FIG. 6, the workpiece 332 comprises steel and is held by a fixture 602. The fixture 602 rests on a steel plate 604 mounted on the stage 304. The stage 304 rests on a stage guide 302 that is mounted on a supportive base 303. The base 303, stage guide 302, and stage 304 make up a support structure of the metrology system, because they support the fixture and its workpiece. The steel plate can also be considered a part of the support structure. At least the portion 606 of the steel plate 604 that lies within a part holding nest 506 can be polished or ground to lower the friction coefficient within the part holding nest 506. In this embodiment, at least a bottom portion of the fixture 602 comprises sapphire. Alternatively, the entire fixture 602 can comprise sapphire. The present invention contemplates obtaining a coefficient of friction that is less than about 0.15. A metal-sapphire surface has a low coefficient of friction of about 0.1-0.15. Thus, the fixture 602 glides along the polished/ground steel surface 606. This low-friction interface between complementary surfaces of the fixture 602 and the steel plate 604 mounted to the stage 302 allows the fixture to move relative to the stage to position its workpiece properly under the spheres.

In another example, the fixture 602 may comprise a metal such as steel (instead of sapphire), because it rests on a ring (not shown) having a sapphire bottom surface resting on the polished/ground steel surface 606 defined by the part holding nest 506. The ring (not shown) can be considered a detachable bottom surface of the fixture. Shapes other than rings may also be used; for example discs or blocks may be used. By further example, an inner portion of a shape may be a ring, but an outer portion may be any other shape such as a square or hexagon. Because a metal-sapphire surface has a coefficient of friction of about 0.1-0.15, the sapphire ring will glide along the polished/ground steel surface 606.

Fixtures 602 and sapphire rings of various sizes may be selected for different workpieces.

In an embodiment where the entire fixture 602 comprises sapphire, a low-friction interface can advantageously be established between complementary surfaces of a steel workpiece 332 and the fixture 602. As stated above, this will allow the workpiece 332 to find a lower position in the fixture 602 to improve measurement accuracy and consistency.

The present invention also contemplates providing a sapphire surface (not shown) within the part holding nest, on which a fixture or workpiece having a complimentary surface (such as polished steel) rests and glides.

The embodiments described above utilize spheres for objects contacting workpiece 332. The present invention contemplates using objects having other shapes. For example, hemispheres and discs may be used rather than spheres. Still further aspects may use any object having a geometry from which a position of the object in a conical sleeve may be used in combination with a position of a differently sized object in the conical sleeve to calculate a characteristic, such as a taper angle of a surface in the conical sleeve. Other characteristics may include cone angle quality.

In an exemplary metrology method, a workpiece is loaded into a fixture that rests on a stage (directly or indirectly). The workpiece may move by sliding on a low friction surface of the fixture. The stage moves the workpiece approximately under a first sphere attached to a first plunger to obtain a first measurement. The first sphere is released for contacting the workpiece. As the first sphere begins contacting the workpiece, the fixture may move by sliding on a low friction surface of the stage. An amount of extension of the first plunger is measured, and used as an indicium of position of the first sphere in the workpiece. The first sphere is retracted and the stage moves the workpiece approximately under a second sphere attached to a second plunger.

Next, the second sphere is released for contacting the workpiece. As the second sphere begins contacting the workpiece, the fixture may move by sliding on a low friction surface of the stage. An amount of extension of the second plunger is measured, and used as an indicium of position of the second sphere in the workpiece. The second sphere is retracted. Thereafter, a characteristic, such as an angle of taper of the conical cavity of the workpiece, is calculated based on the indicia of respective positions of the first and second spheres in the workpiece. The present invention contemplates the measurement assembly moving relative to a stationary workpiece to align the workpiece with the spheres, or both the workpiece and the measurement assembly for proper alignment. In an alternate embodiment of the invention, the measurement assembly remains stationary and the workpiece moves to engage the measurement assembly after alignment of the workpiece with the spheres.

This description is exemplary and it will be apparent to those of ordinary skill in the art that numerous modifications and variations are possible. For example, various exemplary methods and systems described herein may be used alone or in combination with various other metrology systems, control mechanisms including program code, data collection, data visualization techniques, and the like. Various additional steps may be added to methods, including rotating of workpieces for obtaining measurements at different orientations which may improve accuracy or may be for assessing other workpiece characteristics. Additionally, particular examples have been discussed and how these examples are thought to address certain disadvantages in related art. This discussion is not meant, however, to restrict the various examples to methods and/or systems that actually address or solve the disadvantages.

We claim:

1. A method for measuring a characteristic of a workpiece, comprising:

loading a workpiece into a fixture that rests on a support structure, wherein interfacing surfaces of the fixture and the support structure have a coefficient of friction in a certain range;

moving the workpiece and a first measurement assembly relative to each other so that the workpiece is aligned with the first measurement assembly;

moving a component of the first measurement assembly to contact the workpiece to obtain a first measurement of a characteristic of the workpiece, wherein when the component contacts the workpiece, the fixture is adapted to slide on the support structure in response to a force exerted on the workpiece and the fixture by the component; and receiving and calculating the first measurement of the characteristic of the workpiece.

2. The method of claim 1, wherein the bottom surface of the fixture comprises sapphire and the surface of the support structure comprises a metal.

3. The method of claim 1, wherein the bottom surface of the fixture is detachable.

4. The method of claim 1, further comprising a second measurement assembly for measuring a characteristic of a workpiece held by the fixture.

5. The method of claim 4, wherein the workpiece includes a conical cavity, and the first and second measurement assemblies are adapted to measure an angle of taper of the conical cavity.

6. The method of claim 4, wherein the support structure comprises a base, a stage guide, and a stage.

7. The method of claim 6, wherein the stage moves relative to the stage guide to position the workpiece and the fixture properly with respect to the second measurement assembly before the measurement assembly measures a characteristic of the workpiece.

8. The method of claim 4, further comprising data acquisition logic to receive and process the characteristic measured by the first and second measurement assemblies.

9. The method of claim 1, wherein the workpiece comprises metal and a surface of the fixture abuts the workpiece and comprises sapphire.

10. The method of claim 1, wherein the support structure comprises a base, a stage guide, and a stage.

11. The method of claim 10, wherein the stage is adapted to move relative to the stage guide to position the workpiece and the fixture properly with respect to the first measurement assembly before the measurement assembly measures a characteristic of the workpiece.

12. The method of claim 1, further comprising moving the workpiece and a second measurement assembly relative to each other so that the workpiece is aligned with the second measurement assembly; and moving a component of the second measurement assembly to contact the workpiece to obtain a second measurement of the characteristic of the workpiece, wherein when the component of the second measurement assembly contacts the workpiece, the fixture is adapted to slide on the support structure in response to a force exerted on the workpiece and the fixture by the component of the second measurement assembly.

13. The method of claim 12, further comprising receiving and calculating the second measurement of the characteristic of the workpiece.

14. The method of claim 1, wherein interfacing surfaces of the workpiece and the fixture have a coefficient of friction of less than about 0.15.

15. The method of claim 14, wherein one of the interfacing surfaces comprises sapphire and the other of the interfacing surfaces comprises a metal.

16. The method of claim 15, wherein the metal is a polished steel.

17. The method of claim 1, wherein interfacing surfaces of the fixture and the support structure have a coefficient of friction of less than about 0.15.

18. The method of claim 17, wherein one of the interfacing surfaces comprises sapphire and the other of the interfacing surfaces comprises a metal.

19. The method of claim 1, further comprising data acquisition logic to receive and process the characteristic measured by the first measurement assembly.

20. The method of claim 1, wherein a surface of the fixture that abuts the workpiece to hold the workpiece comprises sapphire.

* * * * *